United States Patent

Isomura

[19]

[11] Patent Number: 6,052,946
[45] Date of Patent: Apr. 25, 2000

[54] WINDOW REGULATOR APPARATUS

[75] Inventor: Yukio Isomura, Anjo, Japan

[73] Assignee: Aisin Seiki Kabushiki Kaisha, Aichi-pref, Japan

[21] Appl. No.: 08/978,132

[22] Filed: Nov. 25, 1997

[30] Foreign Application Priority Data

Nov. 29, 1996 [JP] Japan .................................. 8-319682

[51] Int. Cl.⁷ .................................................. E05F 11/48
[52] U.S. Cl. ............................................. 49/352; 49/332
[58] Field of Search ................ 49/352, 332; 254/374; 242/609.1, 602.1, 364; 74/89.2, 89.22

[56] References Cited

U.S. PATENT DOCUMENTS

| | | | |
|---|---|---|---|
| 1,507,712 | 9/1924 | Proudfoot | 254/609.1 |
| 4,813,304 | 3/1989 | Kobayashi | 74/501.5 R |
| 4,878,931 | 11/1989 | Komatsu et al. | 74/89.2 |
| 4,970,827 | 11/1990 | Djordjevic | 49/352 |
| 4,970,911 | 11/1990 | Ujihara et al. | 49/352 |
| 4,995,568 | 2/1991 | Yamagishi et al. | 49/352 |
| 5,062,241 | 11/1991 | DeLand | 49/460 |

FOREIGN PATENT DOCUMENTS 6-212857  8/1994  Japan .

*Primary Examiner*—Daniel P. Stodola
*Assistant Examiner*—Curtis A. Cohen
*Attorney, Agent, or Firm*—Reed Smith Hazel & Thomas LLP

[57] ABSTRACT

A window regulator apparatus for moving a window glass in the vertical direction of a vehicle door incorporates a plurality of pulleys rotatably supported on the vehicle door, a drum rotatably supported to the vehicle door, and a cable jointed to the window glass, guided to the pulleys and looped around the drum. The drum includes a first spiral groove which supports one end of the cable and a second spiral groove which supports the other end of the cable. The second spiral groove is formed to spiral in a direction opposite the first spiral groove. The extending points of the cable relative to the first spiral groove and the second spiral groove are defined to gradually change where the cable releases from the drum in the radial direction of the drum by the rotation of the drum.

3 Claims, 4 Drawing Sheets

WINDOW REGULATOR APPARATUS

FIELD OF THE INVENTION

The present invention generally relates to a window regulator apparatus for moving a window glass in the vertical direction of a vehicle door.

BACKGROUND OF THE INVENTION

An example of a window regulator apparatus is disclosed in Japanese Patent Laid-Open Publication No. 6-212857.

The window regulator apparatus includes a pair of pulleys, a drum and a cable. The pulleys are arranged at a distance from each other along the vertical direction of a vehicle door and rotatably supported to a door panel of the vehicle door, respectively. The drum is rotatably supported to the door panel and contains a spiral groove formed in an outer surface. A slant portion is formed in the outer portion of the drum so as to gradually increase its diameter. The cable is guided to the pulleys and is supported in the spiral groove so as to be looped around the drum. The cable is joined to a window glass through a carrier bracket which is fixed to the window glass.

When the drum rotates in the clockwise direction, a first extending portion of the cable which is extended from the drum to the upper pulley is wired to the drum and a second extending portion of the cable which is extended from the drum to the lower pulley is released from the drum. Therefore, a connecting point of the cable connected with the cable and the carrier bracket travels along the vertical direction of the vehicle door. As a result, the window glass moves along the vertical direction of the vehicle door from an opening position to close a vehicle window.

When the drum rotates in the counterclockwise direction, the first extending portion of the cable is released from the drum and the second extending portion of the cable is wired to the drum. Therefore, the connecting point of the cable travels along the vertical direction of the vehicle door. As a result, the window glass moves along the vertical direction of the vehicle door form a closing position to open the vehicle window opens.

Also, when the drum rotates, extending points of the cable relative to the drum are traveling on the slant portion of the drum by being supported in the spiral groove. Therefore, a moving speed of the window glass changes.

However, when the extending points are traveling on the slant portion, a wired quantity of the cable is different from a released quantity of the cable. The diameter of the drum which corresponds to the extending point of the first extending portion of the cable is different from the diameter of the drum which corresponds to the extending point of the second extending portion of the cable because of the slant portion of the drum. Therefore, the cable loosens relative to the spiral groove.

SUMMARY OF THE INVENTION

A need exists, therefore, for a window regulator apparatus which addresses at least the forgoing drawbacks of the prior art.

According to the present invention, the window regulator apparatus for moving a window glass in the vertical direction of a vehicle door comprises a plurality of pulleys for being rotatably supported to the vehicle door, a drum rotatably supported to the vehicle door and a cable jointed to the window glass, guided to the pulleys and looped around the drum. The drum includes a first spiral groove which supports one end of the cable and a second spiral groove which supports the other end of the cable. The second spiral groove is spiraling to the reverse direction of the first spiral groove. The extending points of the cable relative to the first spiral groove and the second spiral groove gradually change where the cable releases from the drum in the radial direction of the drum by the rotation of the drum.

BRIEF DESCRIPTION OF THE DRAWINGS

The foregoing and additional features of the present invention will become more apparent from the following detailed description of preferred embodiments thereof when considered with reference to the attached drawings, in which.

DETAILED DESCRIPTION OF THE PREFERRED EMBODIMENT

Hereinafter a window regulator apparatus according to embodiments of the present invention is explained with reference to FIGS. 1 through 6.

Figure 1:
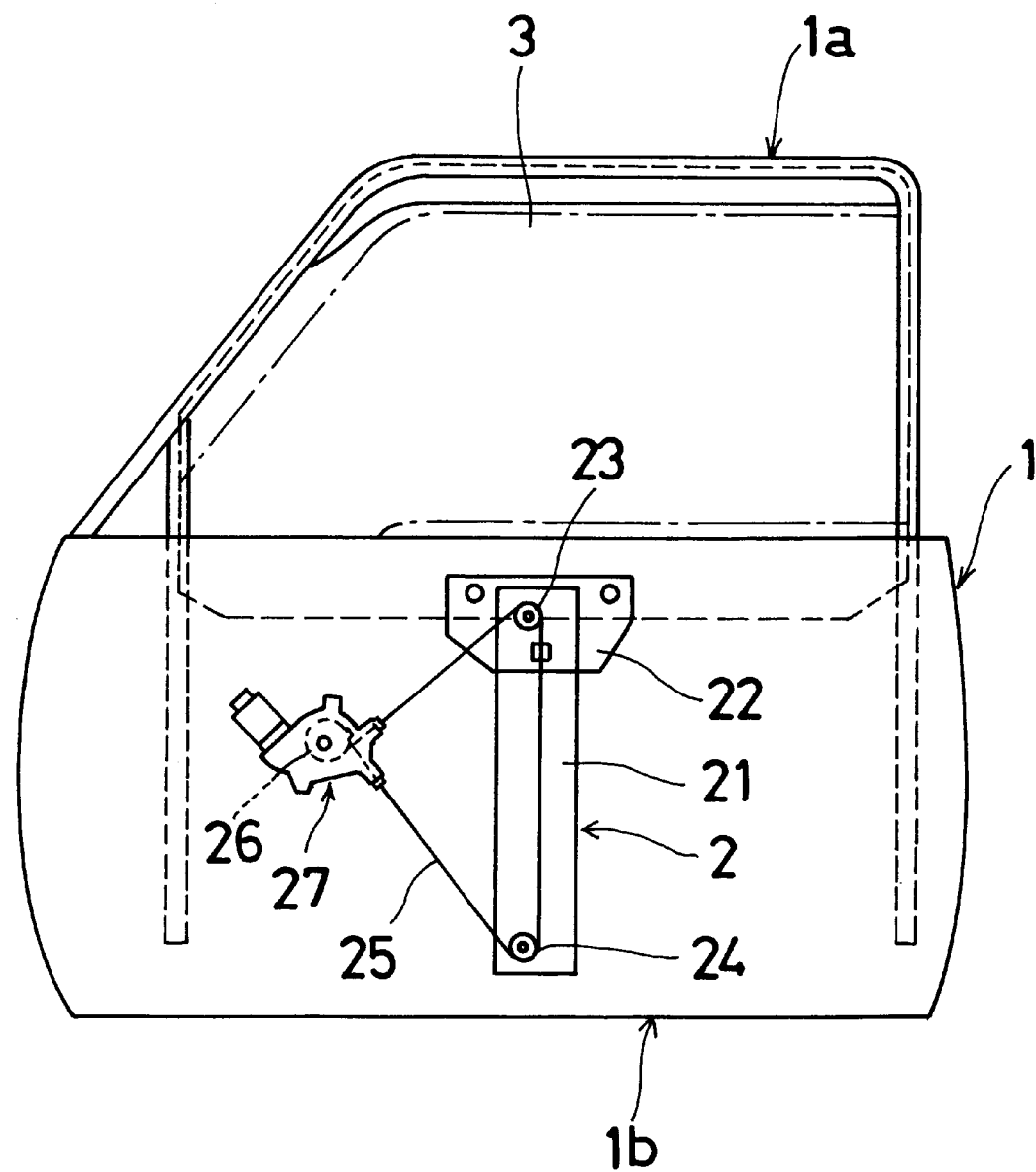
FIG. 1 is a plan view of a vehicle door according to the present invention.

As shown in FIG. 1, a vehicle door 1 includes a door frame 1a and a door panel 1b. The door frame 1a is fixed to the door panel 1b so that a door window 1c is formed in the vehicle door 1. A window glass 3 is slidably supported to the door frame 1a along the vertical direction of the vehicle door 1. The window glass 3 slides by use of a window regulator apparatus 2 so that the door window 1c opens and closes.

The window regulator apparatus 2 is fixed to the door panel 1a of the vehicle door 1.

Figure 2:
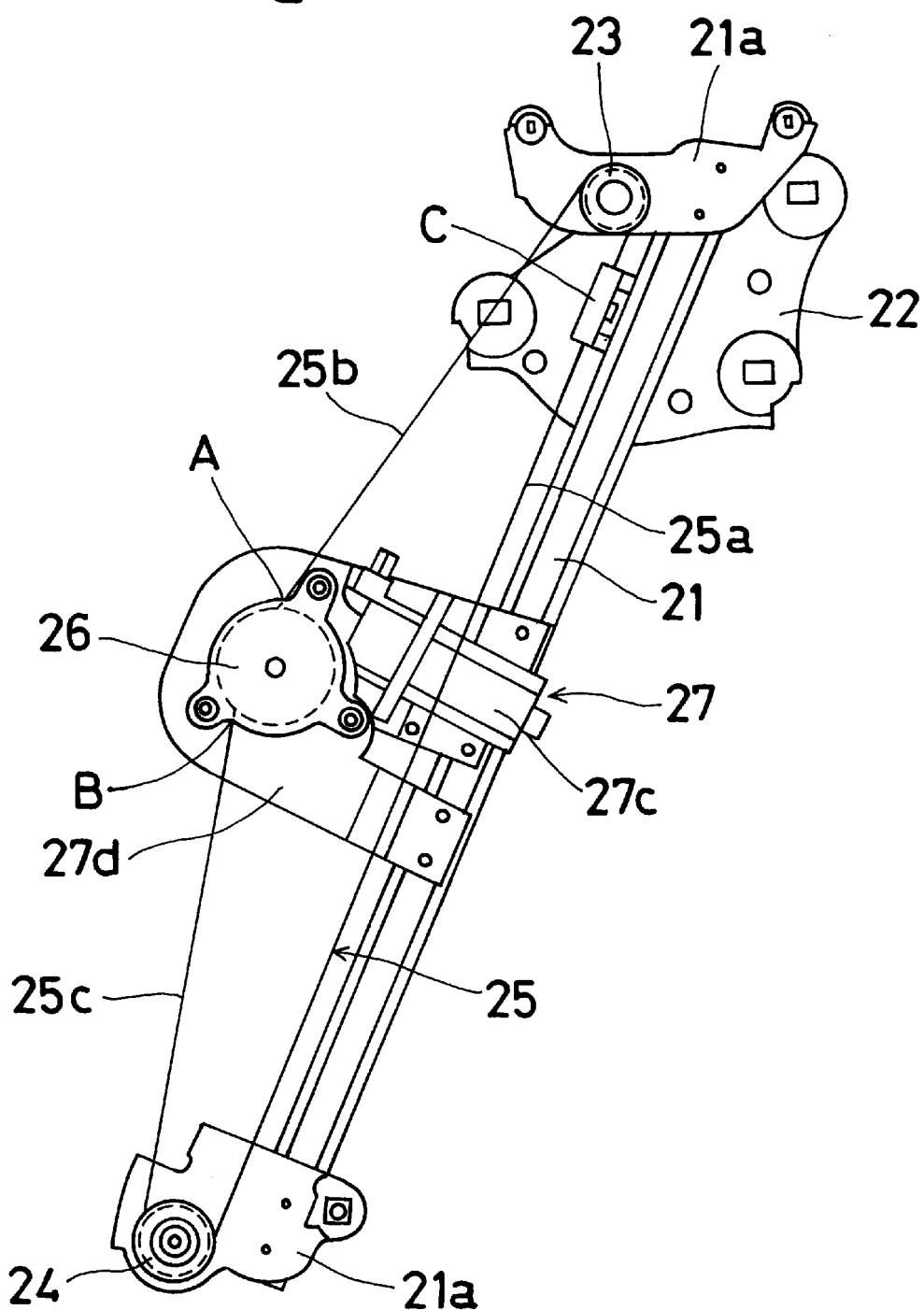
FIG. 2 is a plain view of a window regulator apparatus according to the present invention.

As shown in FIGS. 1 and 2, the window regulator 2 includes a guide rail 21, a carrier bracket 22, an upper pulley 23, a lower pulley 24, cable 25, a drum 26, and a driving mechanism 27.

A guide rail 21 is fixed to the door panel 1a at the upper and lower ends thereof through brackets 21a so that the guide rail 21 is extended along the vertical direction of the vehicle door 1. The carrier bracket 22 is slidably supported to the guide rail 21 along the longitudinal direction of the guide rail 21 and fixed to the window glass 2 of the vehicle door 1. The upper pulley 23 is arranged near the upper end of the guide rail 21 and rotatably supported to the bracket 21a. The lower pulley 24 is arranged near the lower end of the guide rail 21 and rotatably supported to the bracket 21a. The driving mechanism 27 is supported the guide rail 21 through a bracket 27d which is fixed to the guide rail 21. The driving mechanism 27 includes a worm gear 27a (shown in FIG. 3), a worm wheel gear 27b (shown in FIG. 3) and a motor 27c. The worm gear 27a is connected to the motor 27c and meshed with the worm wheel gear 27b. When the motor 27c is driven, the worm wheel gear 27b is rotated through the worm gear 27a. The drum 26 is fixed to the worm wheel gear 27b so that the drum 26 is integrally rotated with the worm wheel gear 27b. The cable 25 is made of one wire. The cable 25 is guided to the upper and lower pulleys 23, 24 and looped around the drum 26. The cable 25 is connected to the carrier bracket 22 at a connecting portion 25a of the cable 25 which is arranged between the upper pulley 23 and the lower pulley 24.

Figure 3:
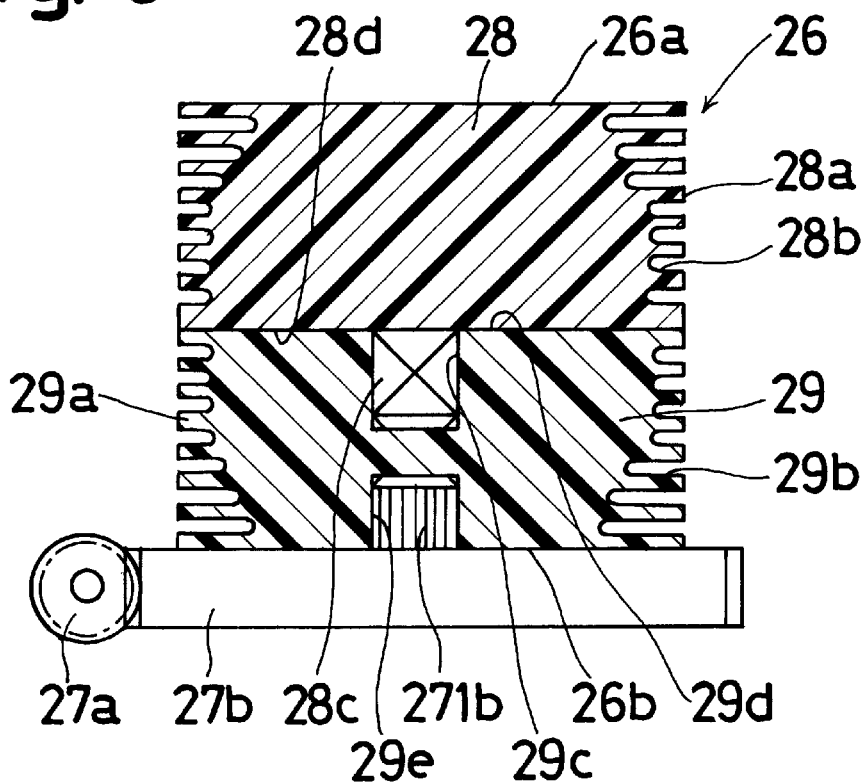
FIG. 3 is a cross-sectional view of a first embodiment of a drum including first and second drum member according to the present invention.
Figure 4:
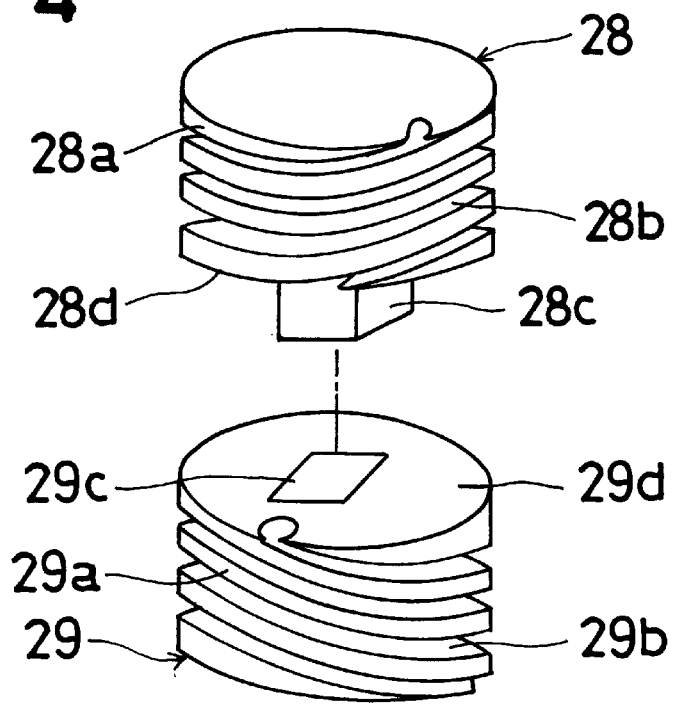
FIG. 4 is an exploded perspective view of the first embodiment of the first and second drum members according to the present invention.

As shown in FIGS. 3 and 4, the drum 26 includes a first drum member 28 and a second drum member 29. The first and second drum members 28, 29 are formed in columnar shapes. The first drum member 28 is arranged on the second drum member 29 along the rotation axis of the drum 26. An insert portion 28c is formed in an attached end surface 28d of the first drum member 28 which is attached to the second drum member 29. The insert portion 28c is shaped as a square or cube. A hole portion 29c is formed in an attached end surface 29d of the second drum member 29 which is attached with the first drum member 29. The hole portion 29c is square-shaped to correspond with the insert portion 28c. The insert portion 28c of the first drum member 28 is inserted into the hole portion 29c of the second portion 29c. Therefore, the first drum member 28 is integrally rotated with the second drum member 29. A serrated axis portion 271b is formed in the worm wheel gear 27b of the driving mechanism 27. A serrated hole portion 29e is formed in the second drum member 28 of the drum 26. The serrated axis portion 271b of the worm wheel gear 27b is inserted into the serrated hole portion 29e of the second drum member 29. Therefore, the drum 26 is integrally rotated with the worm wheel gear 27b.

A first spiral groove 28b is formed in an outer surface 28a of the first drum member 28. The first spiral groove 28b is spiraled in a counterclockwise direction from the attached end surface 28d of the first drum member 28. A depth of the first spiral groove 28b which is positioned in an upper end surface 26a of the drum 26 is the most deep and gradually decreases its depth toward the attached end surface 28d of the first drum member 28 of the drum 26. A depth of the first spiral groove 28b which is positioned near the attached end surface 28d is a standard depth. A second spiral groove 29b is formed in an outer surface 29a of the second drum member 29. The second spiral groove 29b is spiraled in a clockwise direction from the attached end surface 29d of the second drum member 29. A pitch of the first spiral groove 28b is the same as the pitch of the second spiral groove 29b. A depth of the second spiral groove 29b which is positioned in a lower end surface 26b of the drum 26 is the deepest and gradually decreases its depth toward the attached end surface 29d of the second drum member 29 of the drum 26 at the same depth as the first spiral groove 28b. A depth of the second spiral groove 29b which is positioned near the attached end surface 29d is a standard depth.

One end of the cable 25 which is guided in the upper pulley 23 is supported into the first spiral groove 28b of the first drum member 28. The other end of the cable 25 which is guided in the lower pulley 24 is supported into the second spiral groove 29b of the second drum member 29. Therefore, the cable 25 is wired and released from the drum 26 by the rotation of the drum 26. At this time, extending points A and B (show in FIG. 2) of the cable 25 relative to the drum 26 travel along the rotational axis of the drum 26.

When the door window 1c is opened, the cable 25 is supported into the second spiral groove 29b and not supported in the first spiral groove 28b (shown in FIG. 3). The extending point A of the cable 25 is positioned near the attached end surface 28d. The extending portion B of the cable 25 is positioned near the attached end surface 29d.

When the driving mechanism 27 is operating, the drum 26 rotates in the clockwise direction. Therefore, a first extending portion 25b of the cable 25 which extends from the drum 26 to the upper pulley 23 is wound onto the drum 26 and a second extending portion 25c of the cable 25 which extends from the drum 26 to the lower pulley 24 is released from the drum 26. Therefore, a connecting point C of the cable 25 which is connected between the cable 25 and the carrier bracket 22 travels along the vertical direction of the vehicle door 1. As a result, the carrier bracket 22 moves ups along the guide rail 21 and the window glass 3 moves along the vertical direction of the vehicle door 1 from an opening position to close the vehicle window 1c.

When the drum 26 rotates in the counterclockwise direction, the first extending portion 25b of the cable 25 is released from the drum 26 and the second extending portion 25c of the cable 25 is wired to the drum 26. Therefore, the connecting point C of the cable 25 travels along the vertical direction of the vehicle door 1. As a result, the carrier bracket 22 moves down along the guide rail 21 and the window glass 3 moves along the vertical direction of the vehicle door 1 from a closing position to open the vehicle window 1c.

When the drum 26 rotates, the extending points A, B of the cable 25 relative to the drum 26 travel along the rotational axis of the drum 26 and along a radial direction of the drum 26 by being supported in the first and second spiral grooves 28b, 29b. Therefore, a wired and released quantity of the cable 25 changes according to the depth of the first and second spiral grooves 28b, 29b. As a result, a moving speed of the window glass 3 changes. In detail, when the window glass 3 is positioned near the closing position, the moving speed of the window glass 3 becomes slow.

The first and second extending points A, B are always positioned in the first and second spiral groove 28b, 29b at the same depth. Therefore, a wired quantity of the cable 25 is always the same as a released quantity of the cable 25.

Figure 5:
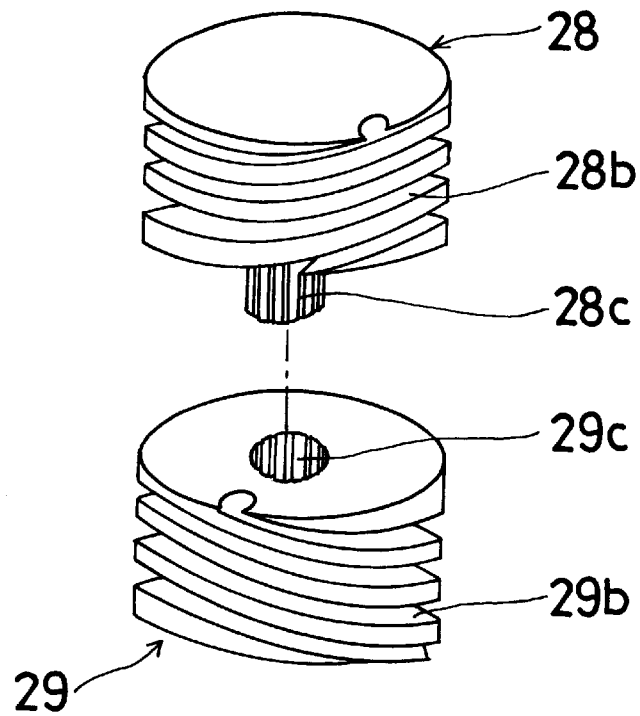
FIG. 5 is an exploded perspective view of a second embodiment of the first and second drum members according to the present invention.
Figure 6:
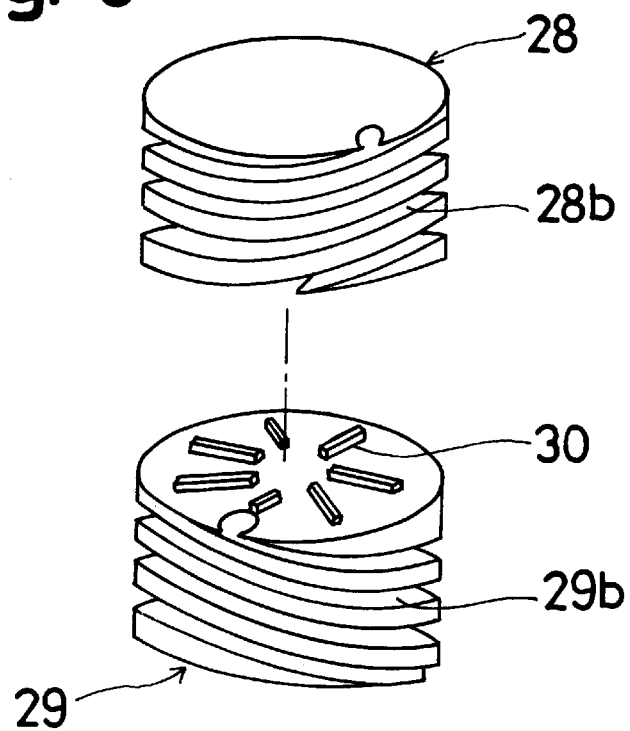
FIG. 6 is an exploded perspective view of a third embodiment of the first and second drum members according to the present invention.

As shown in FIG. 5, the insert portion 28c of the first drum member 28 and the hole portion 29c of the second drum member 29 are formed in a serrated shape. Therefore, a relative position of the first and second extending points A, B can be adjusted. Also, as shown in FIG. 6, a projection 30 which extends in a radial direction of the drum 26 is formed at the attached side surface of the second drum member 29.

The first drum member 28 can be formed with the second drum member 29 in a single body. Also, the cable 25 can be divided into two wires which would be connected between the first drum member 28 and the carrier bracket 22 through the upper pulley 23 and connected between the second drum member 29 and the carrier bracket 22 through the lower pulley 24. Also, the outer surfaces 28a, 29a of the first and second drum 28, 29 can each have a slant portion, respectability. In this case, the depth of the first and second spiral grooves are at a standard depth.

The principles and preferred embodiment described herein is therefore illustrative and not restrictive, the scope of the invention being indicated in the appended claims and all variations which come within the meaning of the claims are intended be embraced therein.

What is claimed is:

1. A window regulator apparatus, which moves a window glass in the vertical direction of a vehicle door, comprising:

a plurality of pulleys rotatably supported on the vehicle door;

a drum rotatably supported on the vehicle door;

a carrier bracket fixedly mounted to the window glass; and a cable operatively joined to the window glass via the carrier bracket, the cable being positioned to be guided on the pulleys, wherein the cable includes first and second extending portions operatively connected to the carrier bracket, the drum includes a first spiral groove in which one end of the cable is connected and a second spiral groove in which the other end of the cable is connected, the second spiral groove being defined to spiral in a direction opposite the first spiral groove, and wherein a depth of the first spiral groove and a depth of the second spiral groove are defined to gradually change along a rotational axis of the drum, and the drum is formed such that the first and second extending portions of the cable are defined and operatively positioned to gradually reel in or reel out the same amount of cable as the other along the radial direction of the drum when the cable releases from the drum as the drum rotates.

2. A window regulator apparatus according to claim 1, wherein the drum includes a first drum member formed with the first spiral groove and a second drum member formed with the second spiral groove, the first drum member and the second drum member being connected together so as to integrally rotate through a connecting means formed between the first drum member and the second drum member.

3. A window regulator apparatus according to claim 2, further comprising a driving mechanism including a motor, a worm gear connected to the motor and a worm wheel gear meshed with the worm gear and then fixed to the drum, wherein the drum and the worm wheel gear integrally rotate through the worm gear by rotation of the motor.

* * * * *